United States Patent
Guiditta et al.

(10) Patent No.: US 10,411,961 B2
(45) Date of Patent: Sep. 10, 2019

(54) IMAGE MANAGEMENT IN CLOUD ENVIRONMENTS

(71) Applicant: Red Hat, Inc., Raleigh, NC (US)

(72) Inventors: Jason C. Guiditta, Oxford, CT (US); Martyn Terence Taylor, Tyne and Wear (GB)

(73) Assignee: Red Hat, Inc., Raleigh, NC (US)

( * ) Notice: Subject to any disclaimer, the term of this patent is extended or adjusted under 35 U.S.C. 154(b) by 304 days.

(21) Appl. No.: 13/973,684

(22) Filed: Aug. 22, 2013

(65) Prior Publication Data
US 2015/0058461 A1 Feb. 26, 2015

(51) Int. Cl.
*H04L 12/24* (2006.01)

(52) U.S. Cl.
CPC .................. *H04L 41/0843* (2013.01)

(58) Field of Classification Search
CPC .......................................................... G06F 8/63
USPC ............................................................ 709/223
See application file for complete search history.

(56) References Cited

U.S. PATENT DOCUMENTS

| | | | | |
|---|---|---|---|---|
| 2008/0263258 | A1* | 10/2008 | Allwell | G06F 9/461 711/6 |
| 2011/0055714 | A1* | 3/2011 | Vemulapalli | G06F 9/5077 715/739 |
| 2011/0231846 | A1 | 9/2011 | Sabin et al. | |
| 2012/0102494 | A1 | 4/2012 | Cahill et al. | |
| 2012/0179817 | A1* | 7/2012 | Bade | G06F 8/61 709/225 |
| 2012/0257820 | A1* | 10/2012 | Sanghvi et al. | 382/159 |
| 2013/0074068 | A1* | 3/2013 | Ciano | G06F 8/63 718/1 |
| 2013/0086578 | A1 | 4/2013 | Eilam et al. | |
| 2013/0232484 | A1* | 9/2013 | Chieu | G06F 9/45558 718/1 |
| 2013/0297922 | A1* | 11/2013 | Friedman | 713/2 |
| 2013/0326503 | A1* | 12/2013 | De | G06F 9/45558 718/1 |
| 2014/0115577 | A1* | 4/2014 | De | G06F 9/5077 718/1 |

(Continued)

FOREIGN PATENT DOCUMENTS

| | | |
|---|---|---|
| CN | 102622264 | 8/2012 |
| CN | 102981888 | 3/2013 |

OTHER PUBLICATIONS

Diaz, Javier, et al. "FutureGrid Image Repository: A Generic Catalog and Storage System for Heterogeneous Virtual Machine Images", Third IEEE International Conference on Coud Computing Technology and Science (CloudCom2011) 10 pages.

(Continued)

*Primary Examiner* — Kevin S Mai
(74) *Attorney, Agent, or Firm* — Lowenstein Sandler LLP

(57) ABSTRACT

A system and method for managing images in a cloud including providing a uniform image management interface for receiving from a user uniform image descriptions for building images in a cloud, and receiving a uniform image description for building an image from the user. The uniform image description is provided to an application to create a cloud-specific image description to provide to an image builder for building the image, and the uniform image description is stored in a local data store.

24 Claims, 5 Drawing Sheets

(56) References Cited

U.S. PATENT DOCUMENTS

2014/0149494 A1* 5/2014 Markley ............... H04L 67/34
709/203

OTHER PUBLICATIONS

MacPherson, Daniel, "CloudForms 1.1 API Guide" 2012, 318 pages.
GitHub "Aeolus-incubator", retrieved from https://github.com/aeolus-incubator/tim, Aug. 22, 2013, 12 pages.

* cited by examiner

IMAGE MANAGEMENT IN CLOUD ENVIRONMENTS

TECHNICAL FIELD

Embodiments of the present disclosure relate to cloud computing and, more particularly, to a technique of managing image building in cloud environments.

BACKGROUND

Cloud computing is generally becoming the platform of choice for businesses that want to reduce operating expenses and be able to scale resources rapidly. Eased automation, flexibility, mobility, resiliency, and redundancy are several other advantages of moving resources to the cloud. Many organizations are being introduced to cloud computing by building an on-premise Infrastructure-as-a-Service (IaaS) cloud, which delivers computing, storage, and networking resources to users. Virtual machines in cloud computing are, for the most part, ephemeral. The state of a virtual machine is not persistent and is lost at shut down. A set of virtual machines can be launched with a particular configuration in a cloud one day and can be launched in a different cloud provider environment the next day. Administrators need to be able to efficiently access data for building virtual machine images.

BRIEF DESCRIPTION OF THE DRAWINGS

Various embodiments of the present disclosure will be understood more fully from the detailed description given below and from the accompanying drawings of various embodiments of the disclosure.

DETAILED DESCRIPTION

Figure 1:
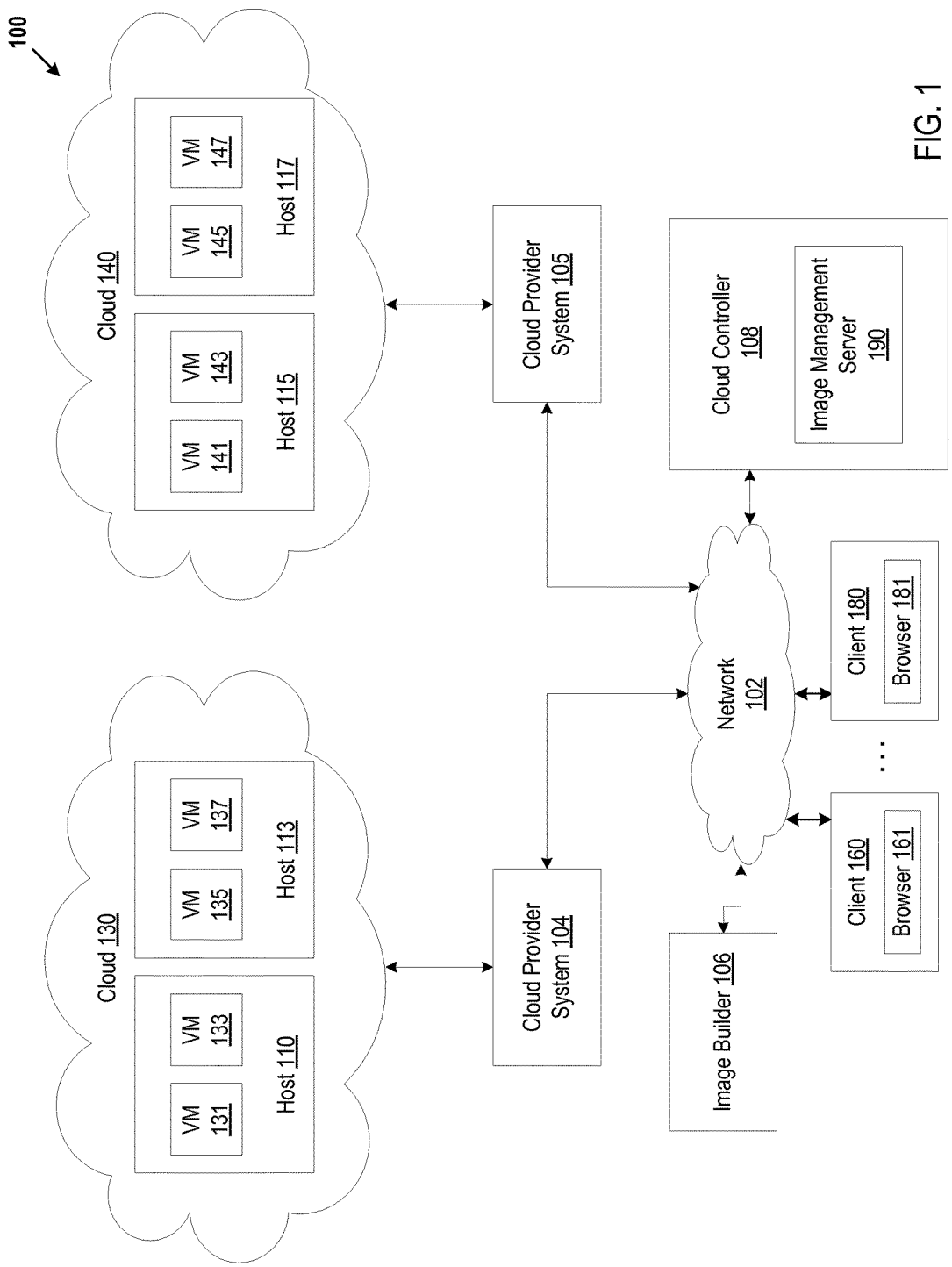
FIG. 1 illustrates exemplary system architecture, in accordance with various embodiments of the present disclosure.

Embodiments of the disclosure are directed to a method and system for building virtual machine images in cloud environments. In one embodiment, a uniform image management interface is provided for receiving uniform image descriptions for building images in a cloud (or multiple clouds) from a user. A uniform image description for building an image is received from the user, and the uniform image description is provided to an image builder for translation to a cloud-specific image description for building the image. The uniform image description is stored in a local data store. Account credentials for the cloud can also be received from the user, and the account credentials are provided to the image builder for launching the image in the cloud.

In one embodiment, a list including a plurality of uniform image description templates is provided to a user, and a selection of a uniform image description template from the list is received. The selected uniform image description template is provided to the user, and a modified uniform image description based on the selected uniform image description template is then received from the user. The uniform image description templates can be based on previously built images. Further, a cloud where an image was built based on the selected uniform image description template can be different from a cloud where an image is to be built based on the modified uniform image description. Also, a status of the building of the image can be requested from the image builder, and a status of the building of the image can be provided to the user based on the request.

For administrators, it can be time-consuming to generate image descriptions (e.g., for virtual machines) for different images in a cloud or clouds. For example, these image descriptions can include an operating system along with services or software that is preinstalled and ready to run in a cloud environment. Furthermore, different clouds can have different requirements with respect to image descriptions, such that creating similar image descriptions for different clouds can also be time-consuming. For example, each cloud provider can require particular processes to register or start an image. Here, consumers of clouds have to write code that steps through these processes of building and registering for each image for each particular cloud.

Embodiments provide an image management server to provide a unified way to describe and manage images across one or more clouds. Here, a common application programming interface (API) processes image descriptions across one or more clouds (e.g., building, managing, and querying). A universal reference can be created that relates equivalent images, along with their components, across all the clouds for which they are built. The equivalent images are not necessarily identical because each cloud may have certain requirements (e.g., requiring certain installations) that cause the images to be different. The image management server receives an image description and provides the image description to an application for creating a cloud-specific image description to provide to an image builder for building of the image for one or more clouds. The user can receive a reference to the image and inquire how the building of the image is progressing and where the image has been deployed. The image builder uses cloud provider specifications to properly build images for particular clouds.

FIG. 1 is a block diagram of a network architecture 100 for a distributed computing system, in which embodiments of the invention may operate. The network architecture 100 can include multiple clouds 130, 140 managed by various cloud provider systems 104, 105. There can be any number of clouds 130, 140 and cloud provider systems 114, 116. For brevity and simplicity, two clouds 130, 140 are used as an example throughout this document. In an embodiment, the network architecture includes clouds from multiple cloud providers or hosts. The clouds 130, 140 provide virtual machines. There can be any number of virtual machines in a cloud 130, 140. For brevity and simplicity, four virtual machines in each cloud 130, 140 are used as an example in architecture 100. For example, cloud 130, provides virtual machines 131, 133, 135, and 137, and cloud 140 provides virtual machines 141, 143, 145, and 147. Each virtual machine is hosted on a physical machine configured as part of the cloud 130, 140. Such physical machines are often located in a data center. For example, virtual machines 131 and 133 are hosted on host 110 in cloud 130 provided by cloud provider system 104, virtual machines 135 and 137 are hosted on host 113 in cloud 130 provided by cloud provider system 104, virtual machines 141 and 143 are hosted on host 115 in cloud 140 provided by cloud provider system 105, and virtual machines 145 and 147 are hosted on host 117 in cloud 140 provided by cloud provider system 105. The cloud provider systems 104, 105 and clouds 130, 140 may be provided as an infrastructure as a service (IaaS) layer. The cloud provider systems 104, 105 and clouds 130, 140 may be provided by, for example, a third party cloud provider or a private party. For example, cloud provider system 104 and cloud 130 may be provided by Cloud-Provider-1, and cloud provider system 105 and cloud 140 may be provided by Cloud-Provider-2. A cloud provider can provide more than one type of cloud provider system 104, 105 and more than one type of cloud 130, 140. The cloud provider can be an entity. An entity, as referred to here, can represent any person, a business organization such as a corporation, an educational institution such as a college or university, etc. Users can interact with applications executing on cloud-based virtual machines using client computer systems, such as clients 160, 180, via corresponding web browser programs 161, 181. Users may have one or more accounts associated with a cloud provider system 104, 105.

Clients 160, 180 are connected to hosts 110, 113, 115, 117 and the cloud provider system 104, 105 via a network 102, which may be may be a private network (e.g., a local area network (LAN), a wide area network (WAN), intranet, or other similar private networks) or a public network (e.g., the Internet). Each client 160, 180 may be a mobile device, a PDA, a laptop, a desktop computer, or any other computing device. Each host 110, 113, 115, 117 may be a server computer system, a desktop computer or any other computing device. The cloud provider system 104, 105 may include one or more machines such as server computers, desktop computers, etc.

In one embodiment, the cloud provider system 104, 105 is coupled to a cloud controller 108 and an image management server 190 via the network 102. The cloud controller 108 and image management server 190 may reside on the same machine or different machines (e.g., server computers, desktop computers, etc.). The image management server 190 can be a plugin for the cloud controller 108, or the image management server 190 can be a separate application. The cloud controller 108 and image management server 190 may be maintained by a cloud consumer of cloud 130, 140 such as an enterprise (e.g., business, company). In another embodiment, the cloud controller 108 and image management server 190 may be maintained by a third party cloud provider. In yet another embodiment, the cloud controller 108 and/or image management server 190 may be part of the cloud provider system 104, 105.

The cloud controller 108 may manage the execution of applications in the cloud 130, 140. The image management server 190 may receive input, for example, from a system administrator via a client 160, 180, describing VMs 131, 133, 135, 137, 141, 143, 145, 147 (e.g., image descriptions) to be deployed in the cloud 130, 140 for execution of the applications. A VM may execute one or more applications. Alternatively, several VMs may be used to execute a single application (a composite application), with each virtual machine executing one or more components of a composite application. The image management server 190 can communicate with the cloud controller 108 to create instructions for an image builder 106 to use in building VMs (e.g., images).

The image builder 106 can be populated with application deployment data (e.g., cloud-specific image descriptions or instructions based on received image descriptions) to be used to build and deploy the VMs 131, 133, 135, 137, 141, 143, 145, 147. In one embodiment, the cloud controller 108 generates the application deployment data based on the user input received through the image management server 190, and sends the application deployment data to the image builder 106 to use to build and deploy the VMs 131, 133, 135, 137, 141, 143, 145, 147. The image builder 106 may reside on the same machine as the cloud controller 108 or on a different machine connected to the cloud controller 108 via a network and may include a single data structure or multiple data structures (databases, repositories, files, etc.) residing on one or more mass storage devices, such as magnetic or optical storage based disks, solid-state drives (SSDs) or hard drives.

The application deployment data can be described in a structured format that specifies the bootable operating system, along with any software requirements, such as additional software packages to be installed, beyond the base operating system, additional configuration which may be required, for example, network ports on which services should be made available, and specific targeting information to instantiate a virtual machine, for example, a hardware profile, which specifies an amount of RAM and a number of virtual CPUs. The application deployment data can be a hierarchy of data that includes deployables (i.e., deployable instances), assemblies, and templates. Each deployable instance describes an overview of one or more virtual machines (or images) to be deployed as a group. A deployable instance can describe any number of arbitrarily large and complex deployments of virtual machines or a small number of virtual machines. For brevity and simplicity, a deployable instance of four virtual machines is used as an example in architecture 100. A deployable instance can be described by an XML file.

An assembly is a description of a virtual machine to be deployed. An assembly can be described by an XML file. An assembly can include the description of a service to be provided by a virtual machine, the description of a service to be used by a virtual machine, and the description of one or more parameter values to be provided to or relied upon by a virtual machine. The following is an example of a deployable definition, including assemblies:

```
<?xml version="1.0"?>
<deployable version="1.0" name="test">
<description/>
<assemblies>
<assembly hwp="small-x86_64" name="test1">
    <image id="aeaeb15e-1eb3-11e2-b10e-52540028e9a5"/>
</assembly>
<assembly hwp="small-x86_64" name="test2">
<image id="aeaeb15e-1eb3-11e2-b10e-52540028e9a5"/>
</assembly> <assembly hwp="small-x86_64" name="test3">
<image id="aeaeb15e-1eb3-11e2-b10e-52540028e9a5"/>
</assembly>
    </assemblies>
</deployable>
```

A template is a description of a disk image and meta-data for creating a virtual machine image. The disk image description parameters can include the an operating system, the version of the operating system, packages, applications, and the operating environment. The meta-data component can allow users to define additional information about the image, which can be used for tagging and searching. An example usage of meta-data is the enforcement of particular security requirements. For example, a meta-data entry could tag a template with "security=internal". This can later be used at the build phase to ensure that any images based on this image are pushed to internal clouds only. The meta-data in a template can be selected at the discretion of the template owner. A virtual machine image can be created based on a template, as will be discussed in more detail below. A virtual machine image can be launched to instantiate (create) a virtual machine in a cloud. A template can be described by an XML file. The following is an example of an image template:

```
<template>
<name>f15jeos</name>
<os>
<name>Fedora</name>
<version>15</version>
<arch>x86_64</arch>
<install type='url'>
<url>http://download.devel.redhat.com/released/F-15/GOLD/Fedora/x86_64/os/</url>
</install>
<rootpw>test</rootpw>
    </os> <description>Fedora 15</description>
    </template>
```

Upon receiving a command identifying a specific deployable instance to launch, the cloud provider system 104, 105 can retrieve a reference to the existing image for each virtual machine available to be run/cloned on top of a hypervisor (not shown) from the image builder 106. The command may be received from the cloud controller 108 or a user (e.g., a system administrator) via a console computer or a client machine. The images can be launched in the cloud 130, 140 to instantiate the virtual machines 131, 133, 135, 137, 141, 143, 145, 147 for the deployable instance. Launch of a virtual machine can include powering on or booting a virtual machine.

Figure 2:
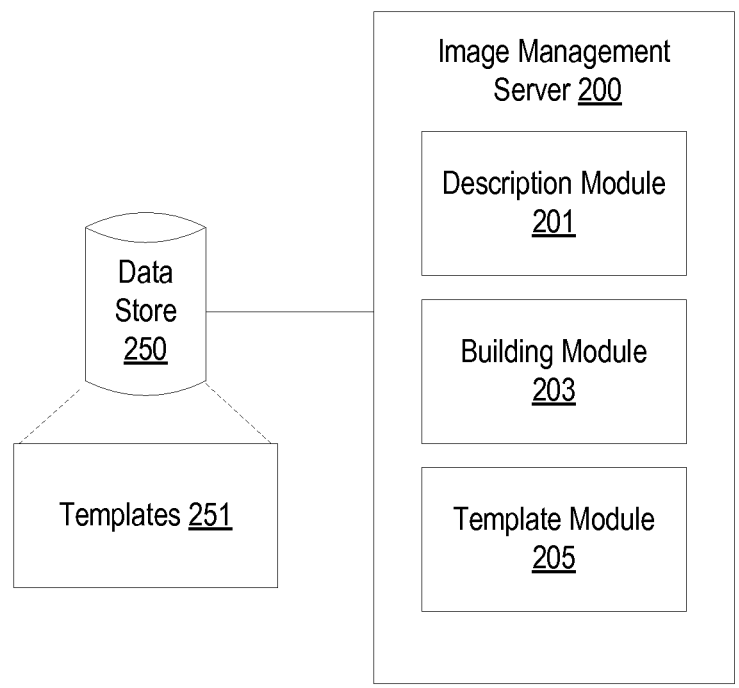
FIG. 2 is a block diagram of an image management server, in accordance with an embodiment.

FIG. 2 illustrates a block diagram of one embodiment of an image management server 200. In one embodiment, the image management server 200 can be the same as the image management server 190 of FIG. 1. Image management server 200 includes a description module 201, a building module 203, and a template module 205. Note that in alternative embodiments, one or more of the description module 201, building module 203, and/or template module 205 may be combined into a single module. Additionally, the functionality of any of the description module 201, building module 203, and template module 205 may be divided between multiple modules.

In one embodiment, the image management server 200 provides an interface for a user (e.g., a system administrator) to enter a uniform image description. Here, the description module 201 receives a description for an image from a user. For example, a user can enter description parameters for a particular image, such as a virtual machine with a particular version of a particular operating system with a particular CPU, a particular quantity of RAM, and a list of software to be installed on the virtual machine. The user would enter this information into the description module 201 using uniform (or standardized) parameters to specify these desired aspects of the image. For example, the description module 201 may provide a graphical user interface (GUI) presenting a set of image description parameters, with each parameter having a drop-down list of options for user selection. In other words, the image management system 200 receives the same description, regardless of the cloud where the image will be launched.

In on embodiment, the description module 201 can also receive account credentials for one or more cloud providers such that, once the image is built for a particular cloud according to the image description, the image can be launched on that cloud.

The description module 201 can also store image description (e.g., description parameters discussed above) that the user provides as templates 251 in a data store 250. In one embodiment, the image, once it is built, can also be stored in the data store. However, for some clouds, the image is built in the cloud, so a reference to the image can be stored in the data store 250 for these clouds.

Once the image description has been received, the building module 203 can provide the image description to an application (e.g., a cloud controller) and request that the application prepare specific instructions (i.e., instructions for a cloud-specific image description) based on the requirements of the particular cloud. For example, cloud requirements can define security restrictions on an image description template such that the resulting image is only built and used with in a particular region (e.g., the United States). The instructions for a cloud-specific image description can include cloud specific details, such as the particular format a potential cloud requires and the inclusion of hardware drivers, such as networking interfaces, etc. The building module 203 can then request an image builder to build an image corresponding to the cloud-specific image description. In other embodiments, the building module 203 can provide the image description to the image builder so that the image builder can prepare a cloud-specific image description to build the corresponding image, or the application receiving the image description can actually build the image based on the description using the requirements of the particular cloud.

In one embodiment, images for clouds provided by multiple cloud providers can be built in one step. Here, using the received image description, the application can prepare specific instructions for each of the clouds based on the requirements of each of the clouds to send to the image builder, so that the image builder can build images corresponding to the image description for launch in each of the clouds. However, the specific instructions for each of the clouds are prepared based on the single uniform image description entered by the user. In other words, the user does not need to know the requirements of various clouds, and only has to enter the uniform image description once, and the image can be built for launch in different clouds even if those clouds have different image requirements.

Once the building module 203 has requested that the image be built, the building module 203 can receive user requests for status of the image, and send status information regarding the status of the image as it is being built. For example, a status of creation of a provider image or a template image that is sent by the building module 203 to the user can be "new" (e.g., before a request to create the image is sent to the image builder), "pending" (e.g., after the request to create is sent to the image builder), "queued" (e.g., after the request to create has been accepted by the image builder), "in progress" (e.g., after the image builder has started to build the image), "complete" (e.g., after the image has been built), or "failed" (e.g., when the request to create the image is not accepted or the image cannot be successfully built). In another example, a status of deletion of a provider image or a template image sent by the building module 203 to the user can be "inactive" (e.g., before the image builder receives a delete request), "pending" (e.g., after the image builder receives the delete request), "queued" (e.g., after the image builder has accepted the delete request), "in progress" (e.g., after the deletion has started), "complete" (e.g., after the deletion has been completed), or "failed" (e.g., when the delete request is not accepted or if the image cannot be deleted).

In one embodiment, the template module 205 can provide the user with a list of image description templates (e.g., a catalog of previously stored image descriptions) to view. The user can determine whether one of these image description templates is suitable for the current needs of the user. If one of the image description templates is suitable for the current image needs of the user, then the user can select this image description template for building a new (or another) image. If none of the image description templates are suitable, then the user can consider modifying one of the image description templates. For example, the user can select an image description template that approximately suits the current needs or the image description template that is the closest match to the current needs. Once the user has selected this image description template, the user can modify the selected image description template. In one example, the user can select an image description template that matches the user's needs, except that the RAM specified is too low. Once the user has selected this image description template, the user can modify the image description template to specify a desired amount of RAM, and a new image description is created based on the modified image description template. This new image description can now be stored as a template 251 in the data store 250 for future use with, e.g., tracking information, metadata or a reference to the image description template used for its creation. This new image description can be used to build an image in the same cloud that the image description template was originally created for or in a different cloud.

In embodiments, the templates are stored locally to the image management server and/or in the image builder.

In one embodiment, the image management server 200 is a plug-in (e.g., a reusable plug-in) that can be utilized in different applications. The image management server 200 provides both a common way of dealing with images and common functionality, such that it can be used with other applications providing image management. Here, the user encounters the same API and workflow for different clouds. Though a particular cloud may require five steps to build and push an image and another cloud may require only three steps to build and push an image, the user experience of creating the image description is the same for either of the clouds.

In one embodiment, templates take the form of a TDL (Template Definition Language) document. In one example, base images are the top level image object in the image management server, which group together a number of related image objects. A base image can be associated with a single template resource. Image objects, target images, image versions, and provider images associated with a base image are built using the associated template. Base images can also hold meta-data that applies to a group of image objects, such as name, description, tags, etc. Here, to create an image and push the image to the cloud, a base image object is created, and then subsequent image objects are created.

An image version represents a build of a base image. The build (i.e., a raw disk image) is created by the image builder. This build can then translated into various cloud formats. In one example, subsequent target and provider images can be the same with respect to packages, versions, and configuration. A target image is the resulting cloud specific image, once an image version has been translated into the correct format. A provider image is then a target image that has been created and registered with a particular cloud.

Figure 3:
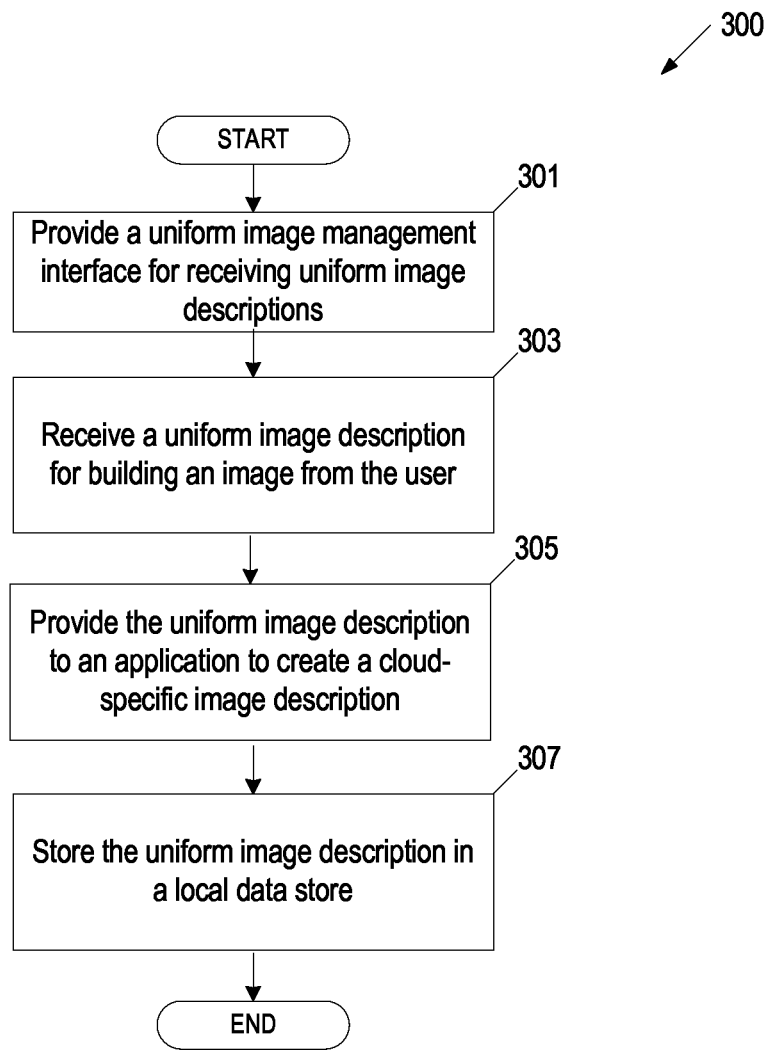
FIG. 3 is a flow diagram illustrating an embodiment of a method of managing image building.

FIG. 3 is a flow diagram of an embodiment of a method 300 of managing image building. The method 300 is performed by processing logic that may comprise hardware (circuitry, dedicated logic, etc.), software (such as is run on a general purpose computer system or a dedicated machine), or a combination of both. In one embodiment, the method 300 is performed by the image management server 200 of FIG. 2.

In block 301, the image management server provides a uniform image management interface for receiving uniform image descriptions. For example, the interface can be a graphical user interface with a series of prompts that prompt the user to select from certain options for image descriptions. In one example, the user is prompted to select an operating system, then the user is prompted to select a version of the selected operating system, then the user is prompted to select an amount of RAM, and then the user is prompted to select one or more software packages from a list of available software packages. In one embodiment, the user can also specify the cloud provider or cloud where the user wants the image based on the image description to be launched. In other examples, the user can type in a list of uniform parameters, provide lists where items can be selected, etc.

In block 303, the image management server receives a uniform image description for building an image from the user. Further, to the example above, the image management server receives each of the selections of the user relating to the desired image description.

In block 305, the image management server provides the uniform image description to an application to create cloud-specific image descriptions to provide to an image builder. In one embodiment, the image management server provides the uniform image description to an application (e.g., a cloud controller) that creates instructions for building an image for one or more particular clouds based on the requirements of these clouds, and then the image management server sends these instructions to an image builder. The image builder can then build the desired image or images to meet the uniform image descriptions entered by the user. Further to the description above, the application creates instructions for the image builder for the specified cloud, where the instructions indicate the desired operating system, the desired version of the operating system, the desired amount of RAM, and the desired software packages to be installed. Once the desired image is built, then the desired image can be pushed to or launched in the desired cloud.

In block 307, the image management server stores the uniform image description in a data store (e.g., a local data store). The uniform image description can be stored for future reference. Here, the image description can be easily accessed by the application, the image builder, and the user.

Figure 4:
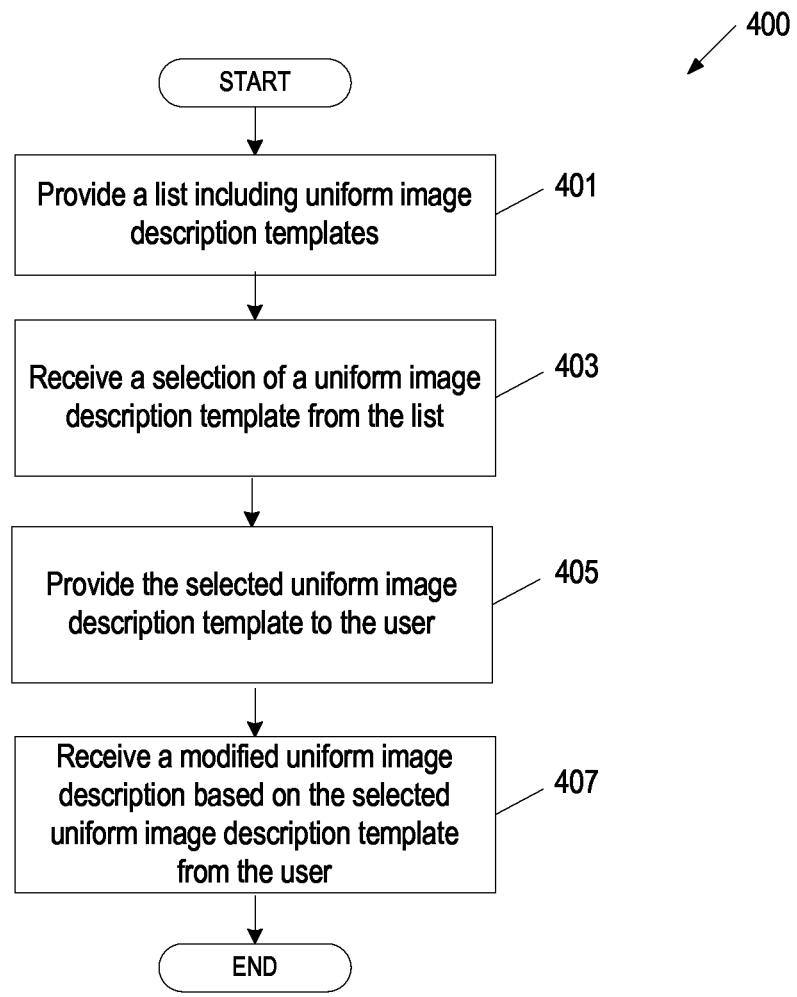
FIG. 4 is a flow diagram illustrating another embodiment of a method of managing image building.

FIG. 4 is a flow diagram of an embodiment of another method 400 for managing image building. The method 400 is performed by processing logic that may comprise hardware (circuitry, dedicated logic, etc.), software (such as is run on a general purpose computer system or a dedicated machine), or a combination of both. In one embodiment, the method 400 is performed by the image management server 200 of FIG. 2.

In one embodiment, uniform image descriptions can be stored as uniform image description templates for use by future users. In block 401, the image management server provides a list including uniform image description templates to a user. In block 403, the image management server receives from a user a selection of a uniform image description template from the list. In block 405, the image management server provides the selected uniform image description template to the user. For example, a user can use the image description template as is it was originally specified, or can modify the image description template. For example, the user can specify a different cloud or cloud provider, a different operating system, or different software packages to be included. However, because the image description template is a uniform image description, it can be used for different clouds provided by different cloud providers, even if the different cloud providers have different image requirements.

In block 407, if the user modifies the image description template, the image management server receives a modified uniform image description based on the selected uniform image description template from the user, which can then be stored as a template for use by future users.

Figure 5:
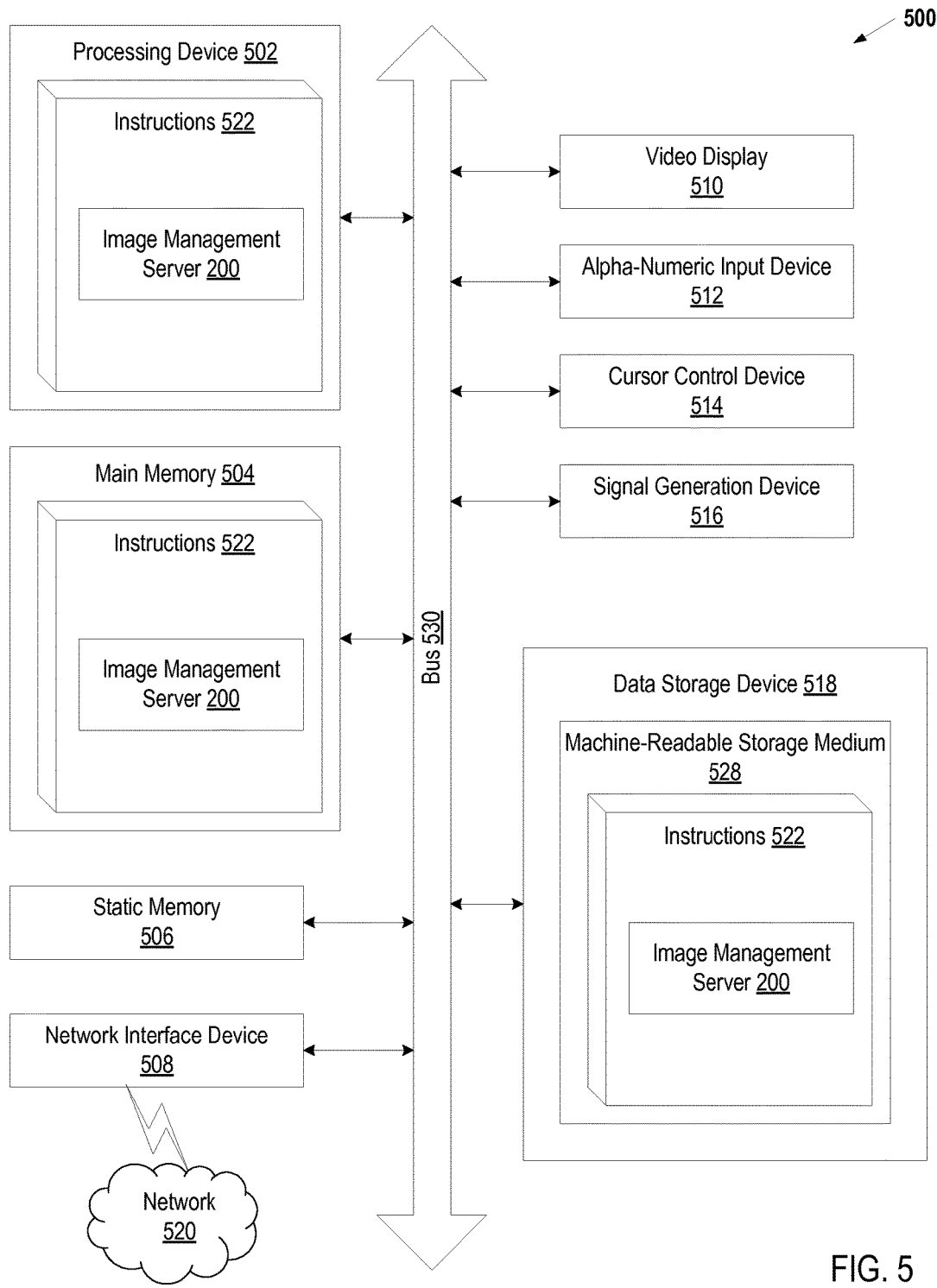
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a permission server (e.g., image management server 200 of FIG. 2), an agent, and/or a software library containing methods that call a template sharing server and/or agent. While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "configuring", "searching", "sending," "receiving," "requesting," "providing," "generating," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system comprising:
a data store; and
a processing device coupled to the data store, the processing device to execute an application programming interface (API) that processes image descriptions across at least a first cloud computing environment and a second cloud computing environment with differing image requirements, wherein the processing device is to execute the API to:
provide a uniform image management interface to receive description parameters for a uniform image description from a client computer system of an administrator;
provide, to a cloud controller managing the first and second cloud computing environments, the uniform image description with a request to prepare a first cloud-specific image description in view of a first set of image requirements for the first cloud computing environment and a second cloud-specific image description in view of a second set of image requirements for the second cloud computing environment, wherein the first and second cloud-specific image descriptions comprise cloud-specific details for the first and second cloud computing environments, respectively; and
receive, from the cloud controller, the first cloud-specific image description and the second cloud-specific image description;
wherein the processing device is further to:
concurrently build a first disk image and a second disk image using, respectively, the first cloud-specific image description and the second cloud-specific image description; and
store the uniform image description in the data store for access by at least one of the cloud controller or the client computer system.

2. The system of claim 1, further comprising the cloud controller coupled to the data store and to the processing device.

3. The system of claim 1, wherein the description parameters for the uniform image description comprise an identification of an operating system, a version of the operating system, an amount of random-access memory (RAM), and identification of one or more software packages.

4. The system of claim 1, wherein to provide the uniform image management interface, the processing device is to:
provide, to the administrator on the client computer system, a series of prompts that are to solicit a series of options for an image description;
detect, via the uniform image management interface, selection of an option from the series of prompts; and
incorporate the selected option within the first and second cloud-specific image descriptions in view of the first and second sets of image requirements, respectively.

5. The system of claim 1, wherein the processing device is further to store, in the data store, the first cloud-specific image description as a template, wherein the template is modifiable, upon request, to generate a third cloud-specific image description in view of second description parameters received through the uniform image management interface.

6. The system of claim 5, wherein the template comprises the third cloud-specific image description and meta-data, wherein the meta-data comprises additional information received within the second description parameters that facilitates tagging and searching of the template from among a plurality of templates.

7. The system of claim 6, wherein the template comprises a base image that stores the meta-data, and wherein the meta-data is applied to a group of image objects comprising name, description, and a set of tags.

8. The system of claim 1, wherein the processing device is to deploy an image builder to build the first and second disk images, and wherein the processing device is further to:
receive, from the client computer system through the uniform image management interface, account credentials corresponding to the first cloud computing environment and for the second cloud computing environment;
provide the account credentials to the image builder; and
in response to receipt of the account credentials by the image builder, launch the first disk image within the first cloud computing environment and the second disk image within the second cloud computing environment.

9. A method comprising:
executing, by a processing device, an application programming interface (API) that processes image descriptions across at least a first cloud computing environment and a second cloud computing environment with differing image requirements;
wherein executing comprises:
providing a uniform image management interface to receive description parameters for a uniform image description from a client computer system of an administrator;
providing, to a cloud controller managing the first and second cloud computing environments, the uniform image description with a request to prepare a first cloud-specific image description in view of a first set of image requirements for the first cloud computing environment and a second cloud-specific image description in view of a second set of image requirements for the second cloud computing environment, wherein the first and second cloud-specific image descriptions comprise cloud-specific details for the first and second cloud computing environments, respectively; and receiving, from the cloud controller, the first cloud-specific image description and the second cloud-specific image description;

concurrently building, by the processing device, a first disk image and a second disk image using, respectively, the first cloud-specific image description and the second cloud-specific image description; and storing, by the processing device, the uniform image description in a data store for access by at least one of the cloud controller or the client computer system.

10. The method of claim 9, further comprising coupling the cloud controller to the data store and to the processing device.

11. The method of claim 9, wherein the description parameters for the uniform image description comprise an identification of an operating system, a version of the operating system, an amount of random-access memory (RAM), and identification of one or more software packages.

12. The method of claim 9, wherein providing the uniform image management interface comprises:

providing, to the administrator on the client computer system, a series of prompts that are to solicit a series of options for an image description;

detecting, via the uniform image management interface, selection of an option from the series of prompts; and incorporating the selected option within the first and second cloud-specific image descriptions in view of the first and second sets of image requirements, respectively.

13. The method of claim 9, further comprising storing, in the data store, the first cloud-specific image description as a template, wherein the template is modifiable, upon request, to generate a third cloud-specific image description in view of second description parameters received through the uniform image management interface.

14. The method of claim 13, wherein the template comprises the third cloud-specific image description and meta-data, wherein the meta-data comprises additional information received within the second description parameters that facilitates tagging and searching of the template from among a plurality of templates.

15. The method of claim 14, wherein the template comprises a base image that stores the meta-data, and wherein the meta-data is applied to a group of image objects comprising name, description, and a set of tags.

16. The method of claim 9, further comprising:

deploying an image builder for building the first and second disk images;

receiving, from the client computer system through the uniform image management interface, account credentials corresponding to the first cloud computing environment and for the second cloud computing environment;

providing the account credentials to the image builder; and in response to receipt of the account credentials by the image builder, launching the first disk image within the first cloud computing environment and the second disk image within the second cloud computing environment.

17. A non-transitory computer-readable storage medium comprising instructions that when executed by a processor device, cause the processor to execute a plurality of operations comprising:

executing an application programming interface (API) that processes image descriptions across at least a first cloud computing environment and a second cloud computing environment with differing image requirements, wherein executing comprises:

providing a uniform image management interface to receive description parameters for a uniform image description from a client computer system of an administrator;

providing, to a cloud controller managing the first and second cloud computing environments, the uniform image description with a request to prepare a first cloud-specific image description in view of a first set of image requirements for the first cloud computing environment and a second cloud-specific image description in view of a second set of image requirements for the second cloud computing environment, wherein the first and second cloud-specific image descriptions comprise cloud-specific details for the first and second cloud computing environments, respectively; and receiving, from the cloud controller, the first cloud-specific image description and the second cloud-specific image description;

concurrently building a first disk image and a second disk image using, respectively, the first cloud-specific image description and the second cloud-specific image description; and storing the uniform image description in a data store for access by at least one of the cloud controller or the client computer system.

18. The non-transitory computer-readable storage medium of claim 17, where the plurality of operations further comprises coupling the cloud controller to the data store and to the processing device.

19. The non-transitory computer-readable storage medium of claim 17, wherein the description parameters for the uniform image description comprise an identification of an operating system, a version of the operating system, an amount of random-access memory (RAM), and identification of one or more software packages.

20. The non-transitory computer-readable storage medium of claim 17, wherein providing the uniform image management interface comprises:

providing, to the administrator on the client computer system, a series of prompts that are to solicit a series of options for an image description;

detecting, via the uniform image management interface, selection of an option from the series of prompts; and incorporating the selected option within the first and second cloud-specific image descriptions in view of the first and second sets of image requirements, respectively.

21. The non-transitory computer-readable storage medium of claim 17, wherein the plurality of operations further comprises storing, in the data store, the first cloud-specific image description as a template, wherein the template is modifiable, upon request, to generate a third cloud-specific image description in view of second description parameters received through the uniform image management interface.

22. The non-transitory computer-readable storage medium of claim 21, wherein the template comprises the third cloud-specific image description and meta-data, wherein the meta-data comprises additional information received within the second description parameters that facilitates tagging and searching of the template from among a plurality of templates.

23. The non-transitory computer-readable storage medium of claim 22, wherein the template comprises a base image that stores the meta-data, and wherein the meta-data is applied to a group of image objects comprising name, description, and a set of tags.

24. The non-transitory computer-readable storage medium of claim 17, wherein the plurality of operations further comprises:
- deploying an image builder for building the first and second disk images;
- receiving, from the client computer system through the uniform image management interface, account credentials corresponding to the first cloud computing environment and for the second cloud computing environment;
- providing the account credentials to the image builder; and
- in response to receipt of the account credentials by the image builder, launching the first disk image within the first cloud computing environment and the second disk image within the second cloud computing environment.

\* \* \* \* \*